L. Fogg,
Buckle,

No. 1,708. Reissued June 21, 1864.

Witnesses.
J. W. Coombs
R. S. Spencer.

Inventor.
Luther Fogg
per Munn & Co
attorneys.

H. PETERS, PHOTO-LITHOGRAPHER, WASHINGTON, D. C.

UNITED STATES PATENT OFFICE.

FREDERICK STEVENS, OF HUDSON COUNTY, NEW JERSEY, ASSIGNEE OF LUTHER FOGG.

IMPROVEMENT IN BUCKLES.

Specification forming part of Letters Patent No. 38,793, dated June 2, 1863; Reissue No. 1,522, dated August 11, 1863; Reissue No. 1,708, dated June 21, 1864.

*To all whom it may concern:*

Be it known that LUTHER FOGG, of Boston, in the county of Suffolk and State of Massachusetts, has invented a new and Improved Buckle; and I do hereby declare that the following is a full, clear, and exact description thereof, reference being had to the accompanying drawings, making a part of this specification, in which—

Figure 1:
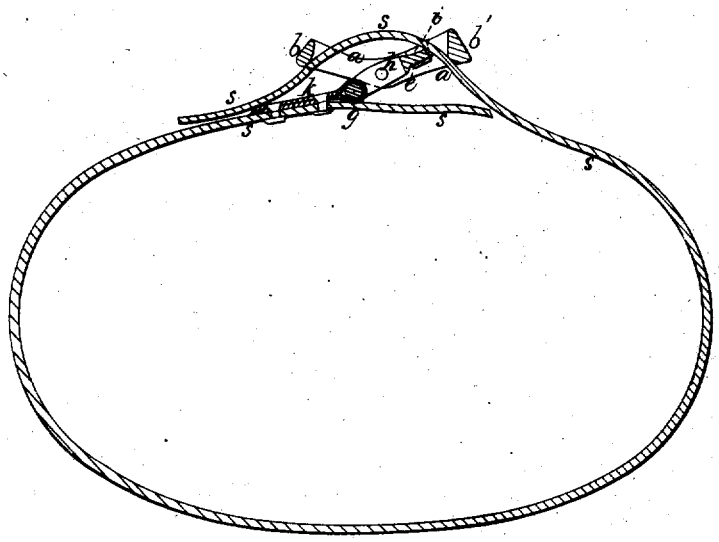
Figure 2:
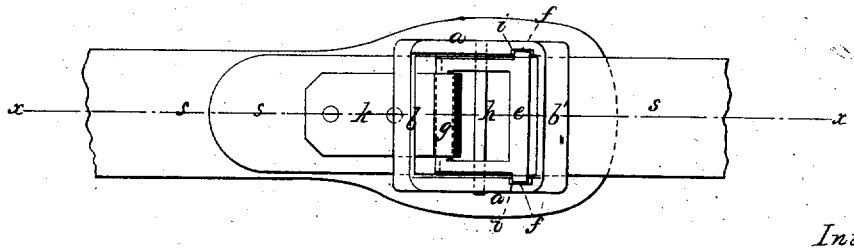

Figure 1 is a longitudinal section through the buckle and the strap, to which it is supposed to be attached. In the figure certain parts of the buckle are lifted from the position they ought to occupy properly to show more clearly the construction and operation of the the several parts. Fig. 2 is a plan or top view of the buckle, with the strap to which it is supposed to be attached delineated in red.

The same letters are used in each figure to designate the same parts.

The object of this invention is to supply a buckle which will grasp and hold the strap in the firmest manner at any desired point and at any required tension, without requiring or producing a perforation of its substance, and capable of being manipulated with the greatest promptness and facility.

Buckles with teeth or points penetrating the substance of the strap necessarily soon weaken it by cutting and separating the fibers or substance of the strap. In straps with holes cut or punched at certain regular distances apart to receive the point of the tongue of the buckle it is evident that injury is done to the strength of the strap by these cuts or holes, while the tension of the strap itself must necessarily be intermittent and dependent upon the distance between the several holes; besides which, it is always necessary to draw the strap beyond the limits of its subsequent tension to enable the tongue to enter the orifices prepared for its reception and to repeat the same operation when the strap is to be loosened or removed.

By this invention these objectionable features in all ordinary buckles are entirely removed. With one hand only the strap with my buckle attached can be drawn just to the tension required, where it will be held firmly and immovably for the time required without injury to the strap, and when it it necessary to remove or loosen it a slight movement disengages the grasp of the buckle and entirely frees the strap.

To enable others skilled in the art to make and use this invention, I will proceed, with the assistance of the drawings, to describe its construction and operation.

This improved buckle, as a whole, consists of three essential parts—that is, a frame, a tongue, and a shank, united and operating in a manner that will be fully set forth in and with the description of these several parts.

The frame is designated in the drawings by the letters *a a*, *a′ a′*, *b*, and *b′*, the tongue by the letter *e*, and the shank by *k*. In the plan view, Fig. 2, the frame appears to be a flat square, or nearly so, but, by reference to Fig. 1, which is a vertical section through the buckle, it will be seen that the sides are bent or curved at or near their center or middle, causing the posterior parts, *a′ a′*, or those toward the end *b*, to form an angle—say, of thirty to forty-five degrees with the anterior parts, *a a*, toward *b′*, both of these several portions of the sides being in line—that is, the anterior portions, *a a*, being in one plane and the posterior, *a′ a′*, in another—the two planes cutting each other at or near the center of motion or axis of the frame. Exact conformity to this structure is not, however, necessary. All that is required to carry out the principle or idea proposed in the construction of this part of the buckle is to give an elevation to the part or bar *b* for purposes that will be explained. A section of the front end or bar *b′* shows a triangular shape, with the angles or corners rounded off, as seen in Fig. 1. The inner face of this end piece or bar, *b*, is made sloping, as shown in the same figure, to allow the tongue to come down freely to its proper position or to escape when the strap or buckle is manipulated for either of these purposes. The form of the other or outer face of this part or bar *b′* is not material. No particular function results from the form of the other end piece or bar, *b*. Its section, therefore, may show a round, square, oval, or any other form. In Fig. 1 it is shown as a half-oval nearly. At the bend or angle made by the junction of the parts *a* and *a′* of the side of the frame an orifice is seen in Fig. 1, intended to receive the ends of the pin or axis *h*, and on the inner face of the parts *a a* near the cross-bar or end piece, *b'*, are recesses or notches *i i*, intended to receive the lugs or pins *f f*, on the sides of the tongue.

The tongue has also four sides—the front, *e*, which is flattened out to form the gripper; the back part or bar, *g*, which is round or rounded to form the pivot or axis of attachment with the shank *k* and the two side pieces, *e' e'*, which connect the end pieces, *e* and *g*, together. (See Fig. 2.) On the ends of *e* are lugs o pins *f f*, before referred to, which fall into the notches or recesses *i i* in the sides of the frame. The front edge of the tongue *e*, that grips the strap against the cross-bar *b'*, is preferably beveled or grooved, as seen in Fig. 1. Each side piece, *e' e'*, of the tongue has a hole or passage through it for the pivot, rod, or axis *h*, which forms the connection between the frame and the tongue.

The shank *k* may be merely a flat strip of brass, copper, or other appropriate material, bent back upon itself and around the posterior part, *g*, of the tongue, and perforated with one or more rivet-holes for the attachment of the buckle to the strap. Of course the pipe formed by bending the sheet metal around *g* or otherwise must be large and loose enough to allow the latter to rotate freely therein.

The letters *s s s s* indicate the strap to which the buckle is supposed to be attached, and the line *x x*, Fig. 2, indicates that of the section represented in Fig. 1.

Instead of the rod *h*, which forms the connection and axis of motion between the frame and the tongue of the buckle, pins may be cast or otherwise made upon the sides *e' e'* of the tongue, to be received into cavities or perforations in the sides of the frame, or the pins or points may be on the frame, to be received into cavities or perforations in the sides of the tongue. In either of these cases it is only necessary to spring out the sides of the frame until the pins or points can enter their respective cavities, when the sides of the frame will close, or may be made to close, back to their proper position.

In all buckles heretofore constructed of three parts—a frame, a tongue, and a shank—each a distinct part of the whole, there is but one line of action or one center of action—that is, the frame, the tongue, and the shank all play upon one axis. In this improved buckle it will be seen that there are two lines of motion, and consequently two axes—one between the frame and tongue and one between the tongue and shank. The latter, therefore, is the center or fulcrum upon which the tongue moves, and the former the connection by which it may be moved or caused to vibrate through the agency of the frame. If the tongue be allowed to drop into its place, with the lugs *f f* resting in the notches *i i*, simply drawing the frame slightly backward will lift it from its position and open a free passage between it and the bar *b'* for introducing the end of the strap. When this is done and a pull is made upon the strap, the frame is brought forward, and necessarily the tongue comes down again and grips the strap. By giving a slope to the interior face of the bar *b'* the strap can be pulled to a certain extent out of the way of the anterior edge of the part *e* of the tongue, and thus allow it to fall lower and get a better grip on the strap against the bar *b'* than it could if not so constructed, and when the thickness of the strap requires, it is further facilitated by making the tongue a little shorter in advance of the axis *h* than the distance between that axis and the interior face of the bar *b'*; but when the draw upon the strap for tightening it is suspended or relaxed, and the strain of holding it is thrown in full force upon the tongue of the buckle, the shortening of the tongue might render it liable to be drawn through the frame and permit the escape of the strap. It is to prevent this that the lugs *f f* may be used, which, taking into the recesses or notches *i i*, effectually prevent such a result. It is proper here to say that these lugs may be on the sides of the frame and the recesses on the tongue, or a bar may be passed entirely across the frame at this place without altering the principle of my improvement on this point. It is obvious that when these lugs or points are brought down firmly into these notches, or the tongue upon the cross-bar suggested as an equivalent therefor, then the tongue can go no farther, and, this occurring when the buckle is exercising its most powerful grip upon the strap, no escape of this can take place without its rupture or breaking the buckle. If the front or gripping edge of the tongue were merely flat, rounded, or sharp, a powerful strain on the strap might draw it through and loosen it. In many cases—as in skate-straps or girths for saddles, &c.—this would be a dangerous occurrence, and to obviate it this edge is made with a shallow groove or double bevel, the edges of this groove or bevel not being sharp enough to cut the strap, and the groove being only deep enough to allow the edges of this groove or bevel to make a strong indentation upon the strap. As the lower edge or angle of the bar *b'*, over which the strap is drawn, is rounded and smooth, if the gripping-edge of the tongue be properly constructed, the wear of the strap will be very slight even from long and constant use.

The objects obtained by giving the back or posterior portion, *a' a'*, of the frame an upward bend or curve, so as to throw it out of the plane of the anterior portion, *a a*, are twofold—first, it thereby becomes a strong, always-open, and easily-used loop for holding the free end of the strap; second, a means of unbuckling or releasing the strap with facility.

If the compression of the strap by the buckle be not very great it may be released in the manner described for lifting the tongue for the first passage of the end of the strap—that is, by merely drawing the frame backward—but when the compression is very strong this becomes difficult, in consequence of the tightness of the grip between the tongue and the part *b'*. In consequence, however, of the peculiar connection of the frame with the tongue through the pivot *h* the frame becomes a lever, and by lifting its posterior end it necessarily raises the anterior gripping-edge, *e*, of the tongue, thereby releasing its hold upon the strap.

Instead of making the tongue, as described, of anterior, posterior, and side pieces, the whole may form but one piece, with or without the lugs *f f* and the pivot *h*, or their equivalents, and the bar *g* at the posterior part, or lugs attached thereto, for forming the connection between it and the shank *k*.

Having thus fully described the construction and operation of this invention, what I claim, and desire to secure by Letters Patent of the United States as the invention of the said LUTHER FOGG, is—

1. The connection of the tongue with the surrounding frame by a hinged joint, substantially as described, in combination with its connection with the metallic shank by a second hinged joint back of and parallel with the hinged joint by which it is connected with the surrounding frame, substantially as described, whereby the tongue can be made to liberate the end of the strap independently of the bending or yielding of the connection between the shank and the strap or other article to which it is to be attached.

2. The curved or bent frame having the inner face of the cross-bar *b'* sloping or beveled, or of equivalent form, in combination with the gripping-tongue, substantially as described.

3. Grooving the gripping end of the tongue, substantially as described, when combined with the surrounding frame, substantially as described.

FREDERICK STEVENS.

Witnesses:
A. DE LACY,
WM. H. BISHOP.